(12) United States Patent
Ohara et al.

(10) Patent No.: US 6,752,188 B2
(45) Date of Patent: Jun. 22, 2004

(54) PNEUMATIC TIRE WITH SPECIFIED BEAD PORTION

(75) Inventors: Yoshio Ohara, Shirakawa (JP); Yukio Endo, Shirakawa (JP); Kiyoshi Ueyoko, Kobe (JP); Kazuki Numata, Shirakawa (JP); Ikuji Ikeda, Shirakawa (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 132 days.

(21) Appl. No.: 09/888,517

(22) Filed: Jun. 26, 2001

(65) Prior Publication Data

US 2001/0050128 A1 Dec. 13, 2001

Related U.S. Application Data

(62) Division of application No. 09/288,506, filed on Apr. 8, 1999, now Pat. No. 6,273,162.

(30) Foreign Application Priority Data

Apr. 10, 1998 (JP) .............................................. 10-99646
May 11, 1998 (JP) .......................................... 10-127664

(51) Int. Cl.$^7$ .......................... B60C 15/00; B60C 15/04; B60C 15/06
(52) U.S. Cl. ...................... 152/540; 152/539; 152/541; 152/547; 152/550; 152/553
(58) Field of Search ............................... 152/540, 541, 152/546, 539, 547, 553, 550

(56) References Cited

U.S. PATENT DOCUMENTS

| | | | | |
|---|---|---|---|---|
| 3,406,733 A | * | 10/1968 | Boileau | 152/547 X |
| 3,612,139 A | | 10/1971 | Marzocchi et al. | |
| 4,872,497 A | * | 10/1989 | Hanada et al. | 152/546 X |
| 5,131,445 A | * | 7/1992 | Tokieda et al. | 152/550 X |
| 5,431,209 A | * | 7/1995 | Kajiwara et al. | 152/546 X |

OTHER PUBLICATIONS

Walter Burton, The Story of Tire Beads and Tires: McGraw–Hill Book Company, Inc., New York, 1954, p. 97.*

* cited by examiner

Primary Examiner—Adrienne C. Johnstone
(74) Attorney, Agent, or Firm—Birch, Stewart, Kolasch & Birch, LLP

(57) ABSTRACT

A pneumatic tire comprises a carcass ply extending between bead portions and is turned up around a bead core in each bead portion to form two turnup portions and a main portion therebetween; each of the turnup portion extends radially outwardly and adjoins the main portion from a certain height above the bead core; a space is surrounded by the carcass ply main portion, and each turnup portion and the bead core is filled with a small size bead apex rubber or a gas; and the bead portion is provided between the carcass ply and the bead core with a bead core cover for preventing the carcass cords from direct contacting with the bead core.

4 Claims, 10 Drawing Sheets

PNEUMATIC TIRE WITH SPECIFIED BEAD PORTION

This application is a divisional application of Application Ser. No. 09/288,506, filed on Apr. 8, 1999, now U.S. Pat. No. 6,273,162 B1 the entire contents of which are hereby incorporated by reference and for which priority is claimed under 35 U.S.C. § 120.

BACKGROUND OF THE INVENTION

1. Field of the Invention

The present invention relates to a pneumatic tire, more particularly to a bead structure being capable of reducing the weight of the bead portions without deteriorating the bead durability.

2. Description of Related Art

In pneumatic tires used under relatively heavy loads such as heavy duty tires for trucks and buses, light truck tires and the like, a large volume of bead apex rubber is disposed between a carcass ply turnup portion and main portion to increase the bead rigidity and thereby to decrease deformation of the tire under heavy loads.

Recently, in order to decrease tire weight, the bead structures have been reexamined, and many efforts have been made to decrease the weight of the bead portions by decreasing the volume of bead apex rubber.

In such tires of which the bead apex rubber is very small, movements and bending deformation of the carcass plies under loads are relatively large. Therefore, as the tension of the carcass cords is large and a large stress concentrates on contacting points with the bead core, the carcass cords are liable to be cut.

SUMMARY OF THE INVENTION

It is therefore, an object of the present invention to provide a pneumatic tire, in which the carcass cords are prevented from being cut and the durability of the bead portions are improved.

According to one aspect of the present invention, a pneumatic tire comprises
a tread portion,
a pair of sidewall portions,
a pair of bead portions with a bead core therein,
a carcass ply extending between the bead portions and turned up around the bead core in each bead portion to form two turnup portion and a main portion therebetween,
each said turnup portion extending radially outwardly so as to adjoin the main portion from a certain height above the bead core, and
a bead core cover disposed between the carcass ply and the bead core for preventing cords of the carcass from directly contacting the bead core, the bead core cover being made of a textile fabric and/or a rubber layer.

Preferably, the bead core cover is made of a textile fabric of organic fiber yarn such as nylon, rayon, polyester and the like.

Embodiments of the present invention will now be described in detail in conjunction with the accompanying drawings.

DETAILED DESCRIPTION OF THE INVENTION

Definitions of Technical Terms

First, the terms used in this specification, namely: "standard rim", "standard pressure", "standard load", "bead base line" and "radial height" are defined as follows:

Standard rim is the "standard rim" specified in JATMA, the "Measuring Rim" in ETRTO, the "Design Rim" in TRA or the like;

Standard pressure is the "maximum air pressure" in JATMA, the "Inflation Pressure" in ETRTO, the maximum pressure given in the "Tire Load Limits at Various Cold Inflation Pressures" table in TRA or the like;

Standard load is the "maximum load capacity" in JATMA, the "Load Capacity" in ETRTO, the maximum value given in the above-mentioned table in TRA or the like;

Bead base line is an axial line passing the bead heel point at the axially outer end of the bead bottom and corresponding to the rim diameter; and Radial height is a height measured radially from the bead base line.

Description of Embodiments of the Invention

Figure 1:
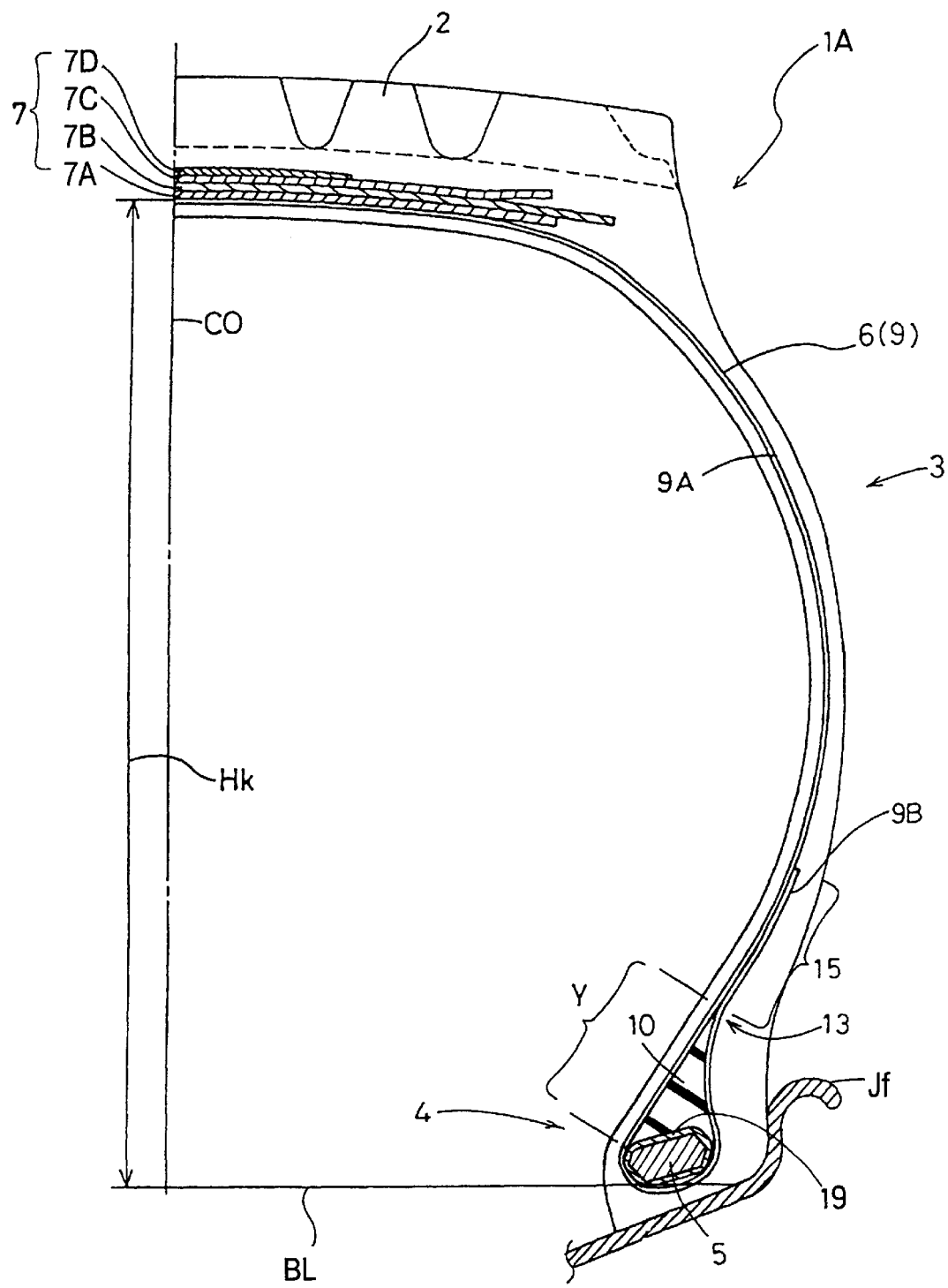
FIG. 1 is a cross sectional view of a heavy duty tire according to the present invention.
Figure 4:
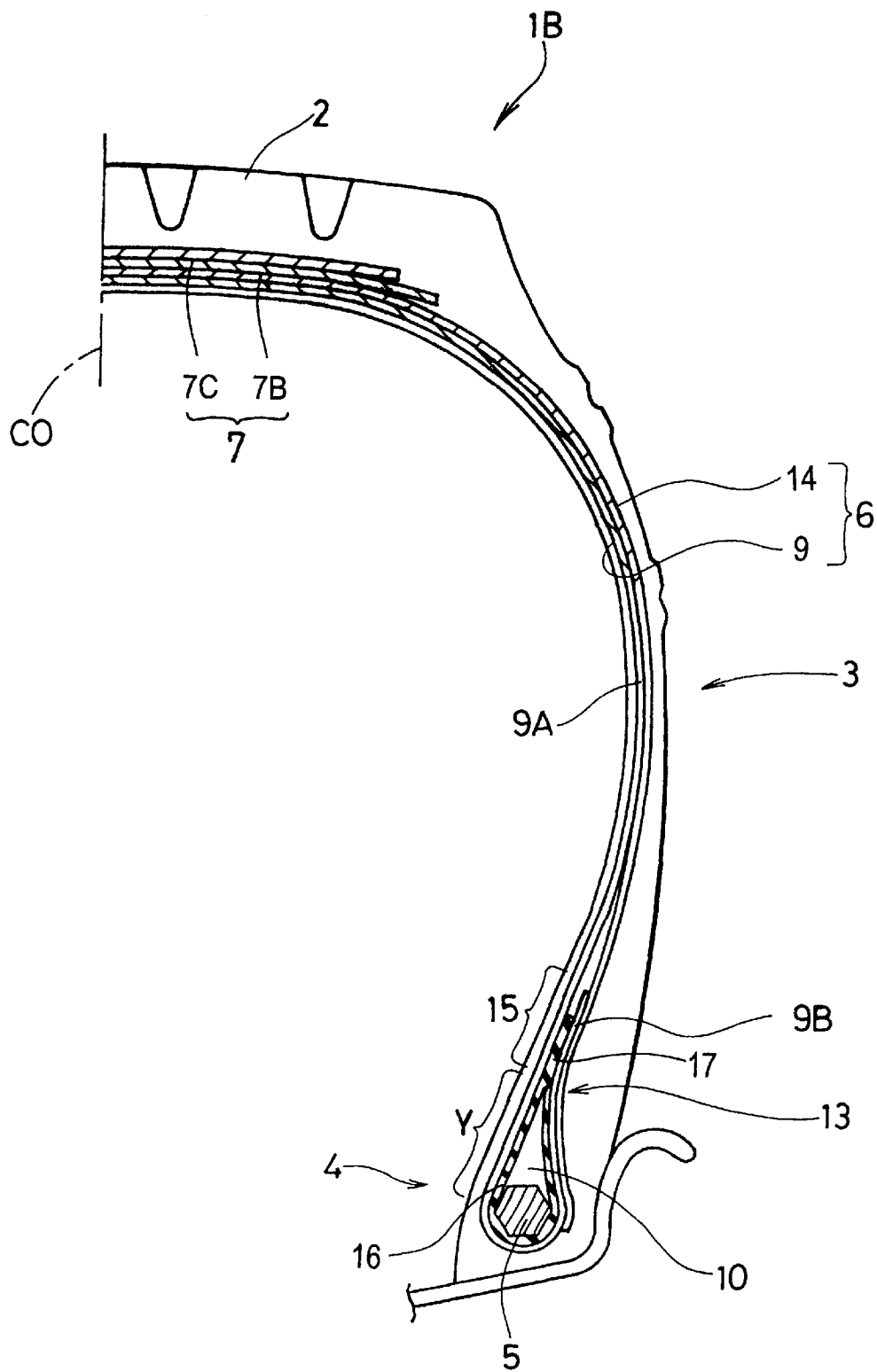
FIG. 4 is a cross sectional view of a light truck tire according to the present invention.
Figure 6:
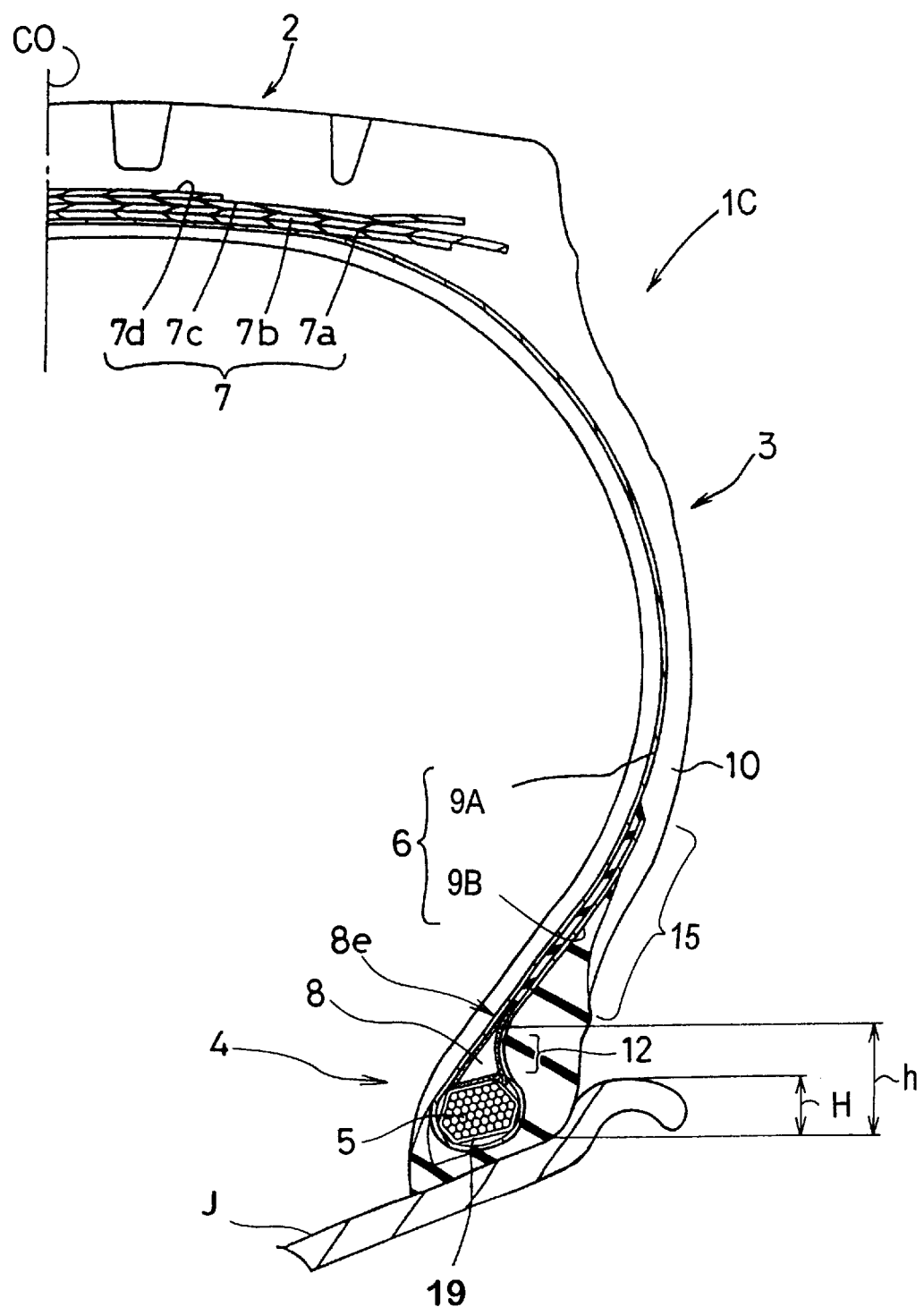
FIG. 6 is a cross sectional view of a heavy duty tire according to the present invention.

In the drawings, FIGS. 1, 4 and 6, the tire 1 (1A, 1B, 1C) according to the present invention comprises a tread portion 2, a pair of sidewall portions 3, a pair of axially spaced bead portions 4 with a bead core 5 therein, a carcass 6 extending between the bead portions 4, a belt 7 disposed radially outside the carcass 6 in the tread portion 2.

The belt 7 comprises at least one ply, preferably at least two cross plies of parallel cords.

For the belt cords, high-elastic-modulus cords such as steel cord are preferably used. But, organic fiber cords, e.g. nylon, aromatic polyamide, rayon and the like can also be used.

The bead core 5 is made of at least one inextensible material, for example, a coiled rubberized steel wire or wires, a coiled high-elastic-modulus organic cord or cords such as aromatic polyamide fiber cord, a wound tape-like material, and the like.

As to the sectional shape of the bead core 5, a hexagonal shape is preferably used. In the case of heavy duty tires to be mounted on a 15-degrees taper rim, it is preferred to use a hexagonal shape, of which the aspect ratio is low and the major axis is inclined at substantially the same angle (10 to 17 degrees) as the inclination of the rim seat (15 degrees).

The bead core 5 is covered with a bead core cover made of a textile fabric 19 and/or a rubber layer 16 to prevent the carcass cords 21 from direct contacting with the bead wire.

The carcass 6 comprises at least one ply 9 of cords 21 arranged radially at an angle of 70 to 90 degrees with respect to the tire equator CO, and extending between the bead portions 4 through the tread portion 2 and sidewall portions 3, and turned up around the bead core 5 in each bead portion 4 from the inside to outside of the tire to form a pair of carcass ply turnup portions 9B and a main portion 9A therebetween.

For the carcass cords 21, steel cords are preferably used in the case of heavy duty tires. However, organic fiber cords, e.g. nylon, rayon, polyester, aromatic polyamide and the like can also be used.

As to the carcass ply turnup portions 9B, the distance from the carcass ply main portion 9A gradually decreases towards the radially outside from the bead core 5, and then, from a certain radial height (h), the distance becomes a substantially-constant minimum value. This part (hereinafter adjoining part 15) in which the distance between the turnup portion 9B and the main portion 9A is minimum and thus these portions adjoin each other has a certain length L2.

Further, a part of the turnup portion 9B between a point at which the carcass ply turnup portion 9B comes into contact with the bead core 5 and a point corresponding to the radially inner end of the adjoining part 15 is curved towards the axially inside. But, in the adjoining part 15, it extends substantially straight along the carcass ply main portion 9A. The carcass turnup portion 9B terminates at a position radially inside the maximum tire width point.

As to the carcass ply main portion 9A, a part which extends radially outwardly from a point at which the carcass ply main portion 9A comes into contact with the bead core 5, is formed substantially straight. This straight part Y extends to the radially inner end of the adjoining part 15 at least, usually to the radially outer end of the adjoining part 15, whereby the carcass cord path is minimized to control the axially outward movement or deformation of the carcass when the tire is loaded. Thus, the deformation of the bead portion can be reduced.

A space defined as surrounded by the carcass ply turnup portion 9B and main portion 9A and the bead core 5 is filled with a small size bead apex rubber 10 or a gas (usually air).

The bead portion 4 is provided along the bottom and axially outside thereof with a chafer 11.

The chafer 11 is made of a relatively hard rubber having a 100% modulus of from 55 to 75 kgf/sq.cm, whereas the sidewall rubber 10 has a 100% modulus of from 10 to 20 kgf/sq.cm. The chafer 11 extends radially outwards from the underside of the bead core 5, with abutting on the axially outside of the carcass 6. The chafer rubber 11 tapered-overlaps the sidewall rubber 10 above the radially outer end of the rim flange Jf. In the overlapped portion, the chafer rubber 11 is positioned on the axially inside of the sidewall rubber 10. On the outer surface of the tire, the radial height L4 of the radially outer edge of the chafer rubber 11 is preferably set in the range of from 1.2 to 2.5 times the flange height H.

If the height L4 is more than 2.5 times H, heat generation increases and cracks are liable to occur on the surface chafer rubber 11, and as a result, the bead durability decreases. If less than 1.2 times H, the radially inner end portion of the sidewall rubber 10 is liable to wear.

If the 100% modulus of the chafer rubber 11 is less than 55 kgf/sq.cm, the bead rigidity is insufficient. If more than 75 kgf/sq.cm, a heat generation increases and the bead durability decreases.

If the 100% modulus of the sidewall rubber 10 is less than 10 kgf/sq.cm, it is difficult to protect the carcass 6 from external injuries. If more than 20 kgf/sq.cm, cracks are liable to occur on the sidewall surface.

EMBODIMENTS

First Embodiment

Figure 2:
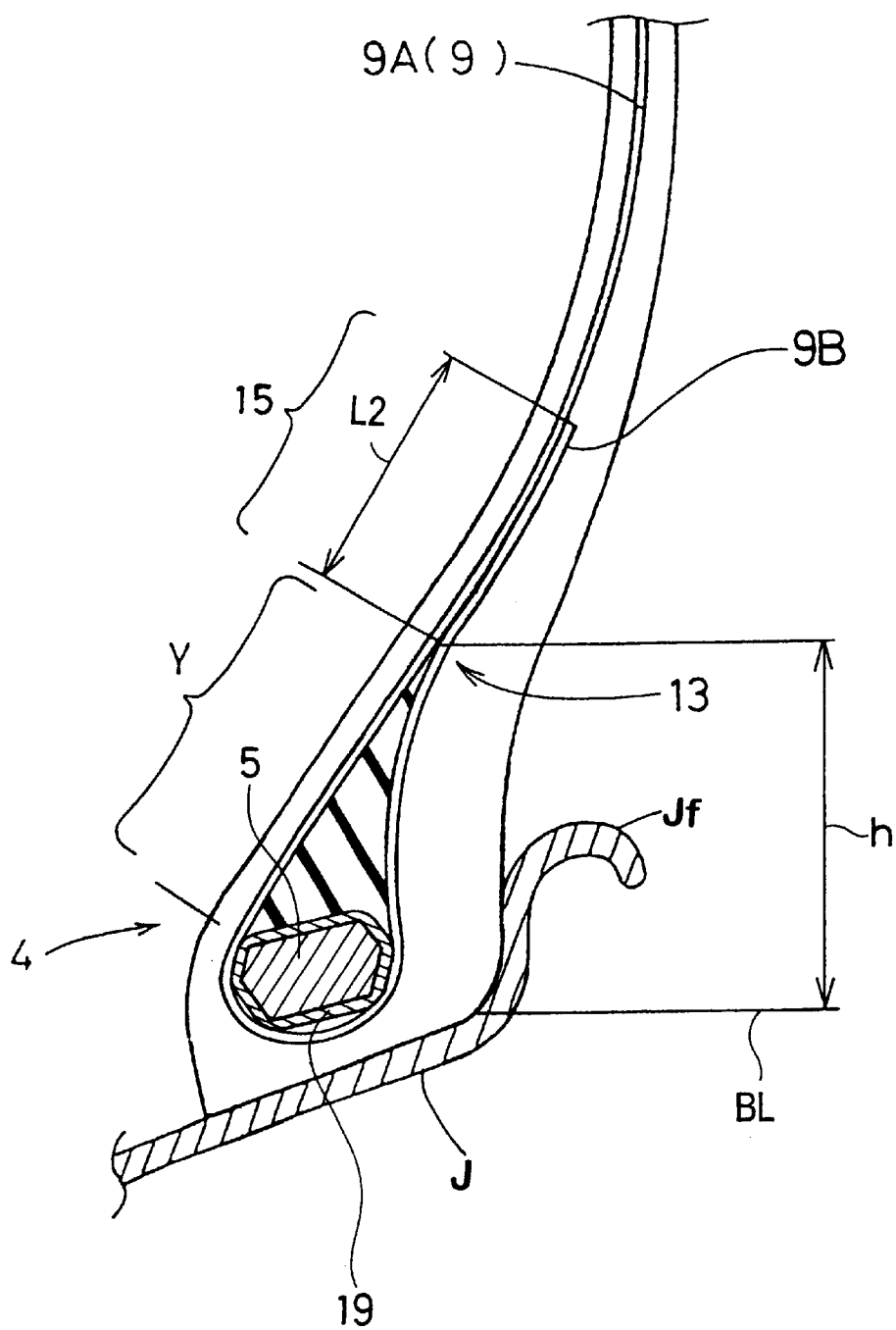
FIG. 2 is an enlarged cross sectional view of the bead portion thereof.

In a first Embodiment, FIG. 1 and FIG. 2 show a heavy duty radial tire 1A according to the present invention, wherein a state of the tire mounted on a standard rim J (a center drop 15-degree taper rim) and inflated to an internal pressure of 50 kpa is shown.

In this embodiment, the bead core 5 is made of a coiled rubberized wire, the sectional shape of which is a hexagon of a low aspect ratio and the major axis thereof is inclined at the substantially same angle as the inclination of the rim seat (15 degrees).

The bead core 5 is covered with a bead core cover made of a textile fabric 19 so as to prevent the carcass cords 21 from direct contacting with the bead wire.

Figure 3:
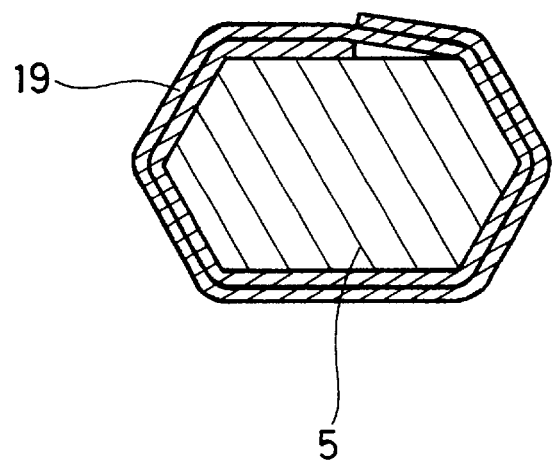
FIG. 3 is a cross sectional view showing the bead core and textile fabric.

The textile fabric 19 is made of organic fiber yarn such as nylon, rayon, polyester and the like. Preferably, the yarn is relatively thin (for example, 940 dtex/2 to 1670 dtex/2) in comparison with the usual tire cords. It is possible to cover the bead core surface partially, but in this example, as shown in FIG. 3, the textile fabric 19 is wound around the bead core 5 in a single layer at least, preferably a double layer, so as to cover all the surface of the bead core 5.

The carcass 6 is composed of a single ply 9 of steel cords comprising a pair of turnup portions 9B and a main portion 9A.

The distance of the carcass ply turnup portion 9B from the main portion 9A becomes a minimum value from a radial height (h) and the adjoining part 15 extends a length H of from 35 to 70 mm. In the adjoining part 15, the rubber thickness measured from the cords of the turnup portion 9B to the cords of the main portion 9A, is set in the range of from 0.5 to 4.0 mm to effectively mitigate a shearing force therebetween.

The space surrounded by the carcass ply turnup portion 9B and main portion 9A and the bead core 5 is filled with a bead apex 10.

The bead apex 10 is made of a relatively hard rubber having a JIS-A hardness of 70 to 100 degrees tapering towards the radially outside from the bead core 5. The radial height (h) of the radially outer end 13 thereof is set in the range of 0.1 to 0.3 times, preferably not more than 0.25 times, more preferably not more than 0.20 times the radial height Hk of the outer surface of the carcass 6 at the tire equator CO.

By the straight part Y of the carcass ply main portion 9A and the curved part of the turnup portion 9B, the thickness of the bead apex rubber 10 is decreased. As a result, the turnup portion 9B comes near a stress neutral line thereby greatly decreasing the compressive stress.

The belt 7 in this embodiment is composed of four plies 7A, 7B, 7C and 7D of parallel steel cords disposed in this order from the inside to the outside. The cord angle of the first ply 7A is 50 to 70 degrees, and the angles of the second, third and fourth plies 7B to 7D are 10 to 30 degrees with respect to the tire equator CO. The inclinations of the cords with respect to the tire equator CO are reversed between the second and third belt plies 7B and 7C.

Comparison Test 1

Heavy duty tires of size 11R22.5 14PR having the structure shown in FIG. 1 and FIG. 2 were prepared and tested for bead durability.

Bead durability test: Using a tire test drum, each test tire was subjected to a 600 hour continuous running test under the following conditions, and the running time to any bead damage was measured.

Running speed: 20 km/h
Tire load: 300% of standard load=9,000 kg
Tire pressure: standard pressure of 800 kpa,
Wheel rim: 22.5×8.25 standard rim The specifications of the tires and test results are shown in Table 1.

TABLE 1

| Tire | Ref. A1 | Ex. A1 | Ex. A2 | Ex. A3 | Ex. A4 |
| --- | --- | --- | --- | --- | --- |
| Carcass | | | | | |
| Height Hk (mm) | 211 | 211 | 211 | 211 | 211 |
| Straight part of main portion | exist | exist | exist | exist | exist |
| Adjoining part length L2 (mm) | 40 | 40 | 40 | 40 | 40 |
| Bead apex rubber | | | | | |
| JIS-A hardness (deg.) | 90 | 90 | 90 | 90 | 90 |
| Height h (mm) | 40 | 40 | 40 | 40 | 40 |
| Textile fabric | — | nylon | nylon | nylon | nylon |
|  | — | 940 dtex/2 | 940 dtex/2 | 1670 dtex/2 | 1670 dtex/2 |
| Layer | — | single | double | single | double |
| Bead durability (hrs.) | 500 | 550 | 600 | 580 | 600 |

Second Embodiment

Figure 5:
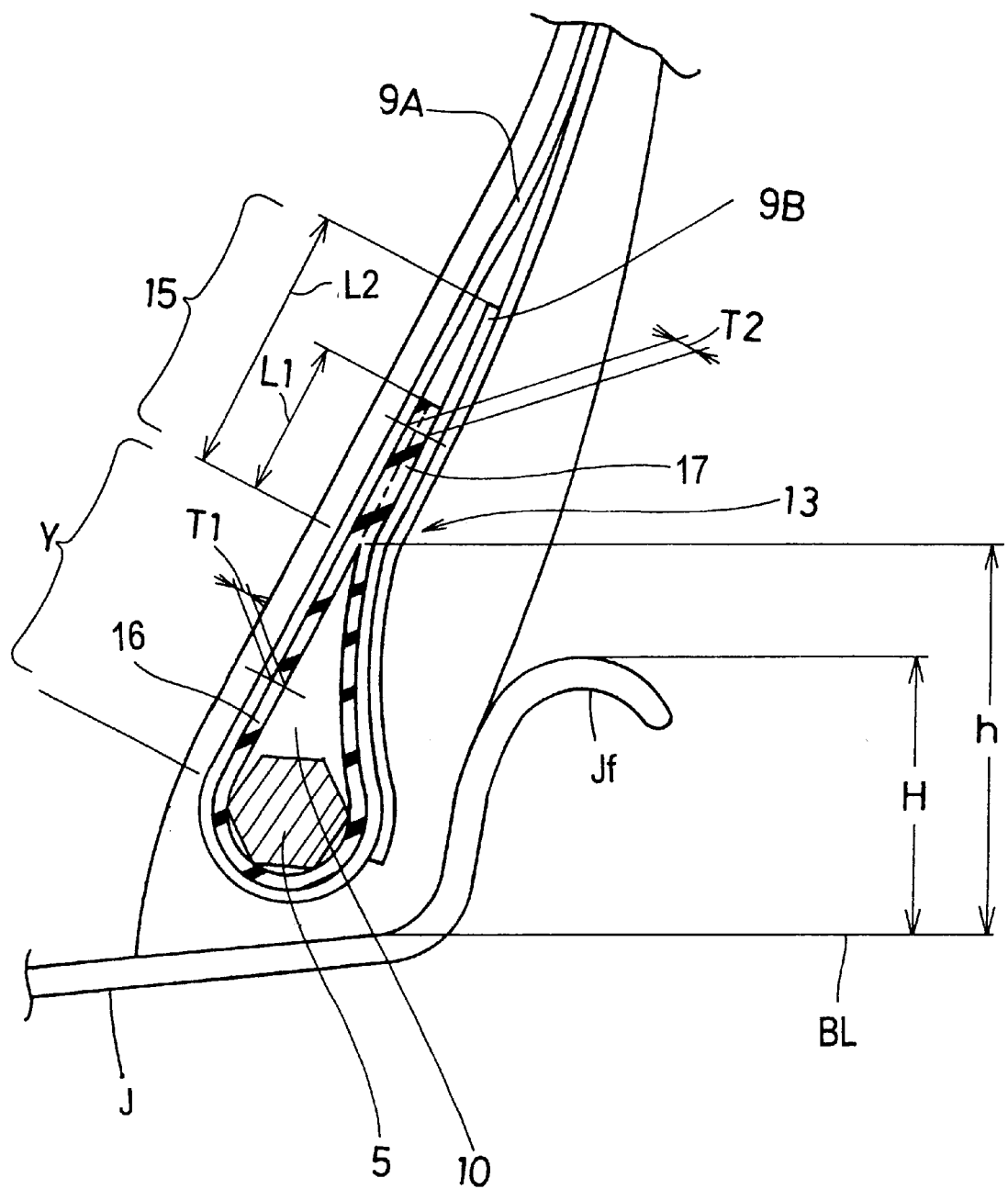
FIG. 5 is an enlarged cross sectional view of the bead portion thereof.

In a Second Embodiment, FIG. 4 and FIG. 5 show a light truck tire 1B according to the present invention, wherein the tire is mounted on a standard rim J and inflated to an internal pressure of 50 kpa.

The belt 7 is composed of at least two cross plies. In this example, two cross plies 7B and 7C of high-elastic-modulus cords such as steel cords and the like are employed.

The bead core 5 is made of a rubberized steel wire coiled in a hexagonal sectional shape.

The carcass 6 comprises one to three plies. In this example two plies 9 and 14 of organic fiber cords 21, e.g. polyester, rayon, nylon, aromatic polyamide and the like are arranged at an angle of 75 to 90 degrees with respect to the tire equator CO.

The inner carcass ply 9 consists of a pair of turnup portions 9B turned up around the bead core 5 from the inside to outside of the tire and a main portion 9A therebetween. The outer carcass ply 14 has however, no turned up portion. The outer carcass ply 14 is disposed on the inner carcass ply 9 so as to cover the outside of the main portion 9A and the outside of the turnup portions 9B, and terminates axially outside or beneath the bead core 5.

Similar to the former tire 1A, a substantially straight part Y of the carcass ply main portion 9A, a curved part of the carcass turnup portion 9B, and an adjoining part 15 of the carcass ply main portion and turnup portion are formed.

In this embodiment, the space surrounded by the carcass ply turnup portion 9B and main portion 9A and the bead core 5 is filled with a bead apex 10.

The bead apex 10 is made of a relatively hard rubber having a JIS-A hardness of 70 to 100 degrees tapering towards the radially outside from the bead core 5. The radial height (h) of the radially outer end 13 thereof is set in the range of from H−15 mm to H+15 mm, wherein H is the rim flange height.

The height (h) in this tire 1B is lower than that of the former tire 1A. In such a tire, during building the tire, the carcass ply turnup portion is liable to come off the outer end of the bead apex rubber 10. In the finished tire, therefore, adhesive failure is liable to occur and air remains in this position which greatly decrease the bead durability.

In order to avoid this problem, as shown in FIG. 5, a first rubber layer 16 is disposed between the carcass 6 and the axially inner and outer surfaces of the bead apex 10.

The first rubber layer 16 has a JIS-A hardness of 50 to 80 degrees which is smaller than the JIS-A hardness of the bead apex rubber and a substantially constant thickness T1 of 1.0 to 3.0 mm.

In this example, the first rubber layer 16 extends continuously from the axially inside to outside of the bead apex 10 through the underside of the bead core 5. Thus, the first rubber layer 16 is also disposed between the carcass and bead core, whereby the carcass cords can be prevented from directly contacting the bead core, and a sharp bend of the carcass cords at the corners of the bead core is prevented. Thus, carcass cord cuts can be effectively controlled.

Incidentally, it is possible to use such a rubber layer and the above-mentioned textile fabric 19 at the same time.

In this example, further, the first rubber layer 16 extends continuously from both the axially inside and outside of the bead apex 10 to the adjoining part 15. In other words, a second rubber layer 17 having a thickness T2 of 2.0 to 6.0 mm (two times T1) and a JIS-A hardness of 50 to 80 degrees is disposed between the carcass ply main portion 9A and the turnup portion 9B in the adjoining part 15. The length L1 of the second rubber layer 17 measured along the carcass 6 is preferably set in the range of from 5 to 15 mm.

If the thickness T1 is less than 1.0 mm, it is difficult to prevent the carcass cords from being cut. If the thickness T1 is more than 3.0 mm, the engaging force between the tire and rim becomes insufficient.

If the thickness T2 is less than 2.0 mm, and/or the length L1 is less than 5 mm, it is difficult to eliminate the air and an adhesive failure is liable to occur. If the thickness T2 and length L1 are more than 6.0 mm and 15 mm, respectively, the weight increases against the primary object.

In this embodiment, the chafer 11 extends radially outwards, while abutting the axially outside of the outer carcass ply 14.

Comparison Test 2

Light truck tires of size 7.00R16 having the structure shown in FIG. 4 and FIG. 5 were prepared and tested for bead durability.

Bead durability test: Using a tire test drum, each test tire was subjected to a 600 hour continuous running test under the following conditions, and the running time to any bead damage was measured.

Running speed: 20 km/h
Tire load: 1100 kg
Tire pressure: 600 kpa
Wheel rim: 5.50F×16 standard rim The specifications of the test tires and test results are shown in Table 2.

TABLE 2

| Tire | Ref. B1 | Ref. B2 | Ex. B1 |
|---|---|---|---|
| Carcass | | | |
| Straight part of main portion | non | exist | exist |
| Adjoining part length L2 (mm) | — | 40 | 40 |
| Bead apex rubber | | | |
| JIS-A hardness (deg.) | 90 | 90 | 90 |
| Height h (mm) | 85 | 28 | 28 |
| Flange height H (mm) | 12.7 | 12.7 | 12.7 |
| Rubber layer 16 | | | |
| Thickness T1 (mm) | — | — | 2 |
| JIS-A hardness (deg.) | — | — | 70 |
| Thickness T2 (mm) | — | — | 4 |
| Length L1 (mm) | — | — | 10 |
| JIS-A hardness (deg.) | — | — | 70 |
| Bead durability (hrs) | 400 | 500 | 600 |

Third Embodiment

Figure 7:
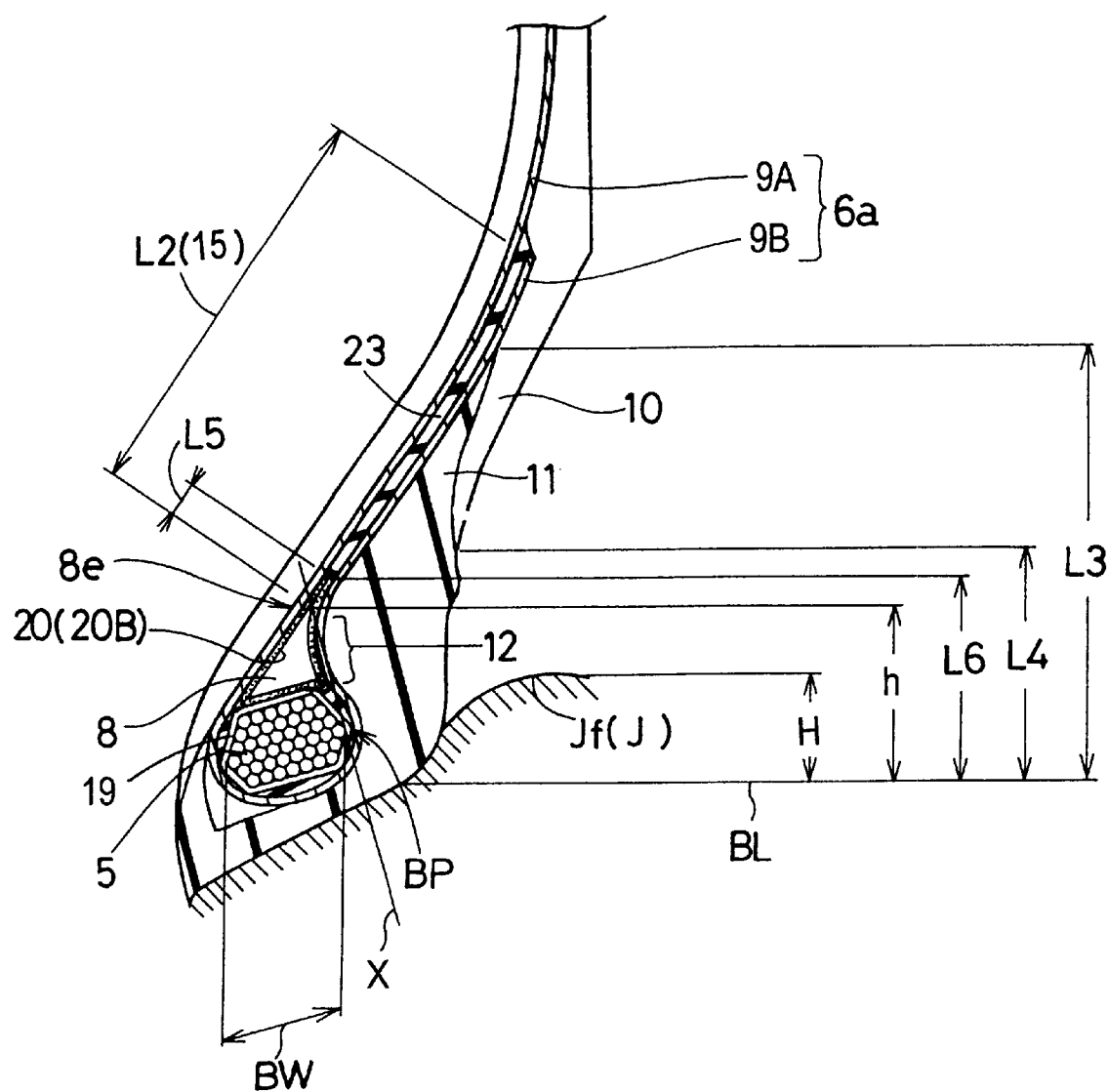
FIG. 7 is an enlarged cross sectional view of the bead portion thereof.

In a Third Embodiment, FIG. 6 and FIG. 7 shows a heavy duty radial tire 1C according to the present invention, wherein the tire is mounted on a standard rim J and inflated to a standard pressure but loaded with no tire load.

In this embodiment, the belt 7 is composed of four plies 7a, 7b, 7c and 7d of parallel steel cords disposed in this order from the inside to outside. The cord angle of the first ply 7a is 50 to 70 degrees, and the angles of the second, third and fourth plies 7b to 7d are not more than 30 degrees with respect to the tire equator CO.

The bead core 5 is made of a coiled rubberized wire, the sectional shape of which is a low aspect ratio hexagon as explained in the tire 1A. And the bead core 5 is covered with a bead core cover made of a textile fabric 19.

The carcass 6 comprises a single ply 9 of steel cords arranged at substantially 90 degrees with respect to the tire equator C.

Similar to the former tires 1A and 1B, a substantially straight part Y of the carcass ply main portion 9A, a curved part 12 of the carcass turnup portion 9B, and an adjoining part 15 of the carcass ply main portion and turnup portion are formed. The curved part 12 extends axially inside or on a straight line X, the straight line X drawn between the axially outmost point BP of the bead core 5 and the outer end 8e of the cavity 8.

In this embodiment, the space surrounded by the carcass ply turnup portion 6B and main portion 6A and the bead core 5 is not filled with a bead apex rubber. The space is filled with a gas, usually air, to form a cavity 8.

As shown in FIG. 7, the cavity 8 tapers towards the radially outside from the bead core 5. The radial height (h) of the outer end 8e thereof is 0.7 to 3.0 times the radial height H of the rim flange Jf. If the height (h) is more than 3.0 times the height H, the bead durability and bead rigidity decrease.

The internal pressure of the cavity 8 is set to be more than an atmospheric pressure.

In order to maintain the internal pressure, the cavity 8 is surrounded by an airtight rubber layer 20 (20A, 20B).

In FIG. 6 and FIG. 7, along the inside of the cavity 8, a sealing layer 20B is disposed.

The sealing layer 20B is preferably made of a butyl rubber containing not less than 30 phr of halogenated butyl rubber. The thickness Ta of the sealing layer 20B is at least 0.2 mm. Especially, when the halogenated butyl rubber content is minimum, it is better to use a thicker layer. Preferably, the thickness Ta (mm) is determined as being not less than 20 times the halogenated butyl rubber content (phr). And, the thickness Ta is not more than 1.5 mm and not more than 50 times the halogenated butyl rubber content (phr).

Figure 8:
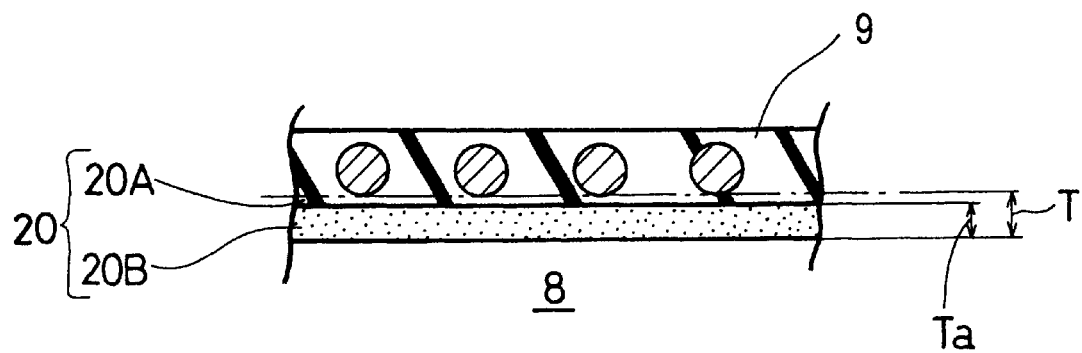
FIG. 8 is an enlarged cross sectional view showing a sealing structure for a bead cavity.

As shown in FIG. 8, when the topping rubber layer 20A of the carcass ply and bead core is very thin and/or the topping rubber is a non-butyl rubber whose principal component is diene rubber, the sealing layer 20B is preferably disposed. However, when the topping rubber layer 20A is thick enough to provide airtightness, the sealing layer 20B may be omitted. Incidentally, the thickness of the topping rubber 20A is in the range of 0.15 to 1.0 mm.

Figure 9:
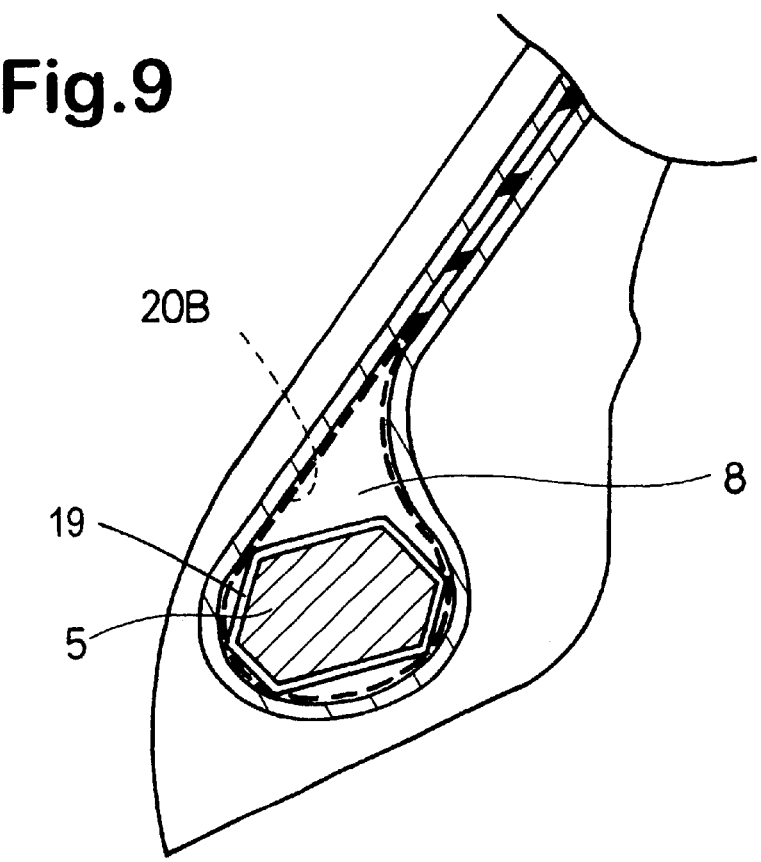
FIG. 9 is an enlarged cross sectional view showing another example of a sealing structure for the bead cavity.
Figure 11:
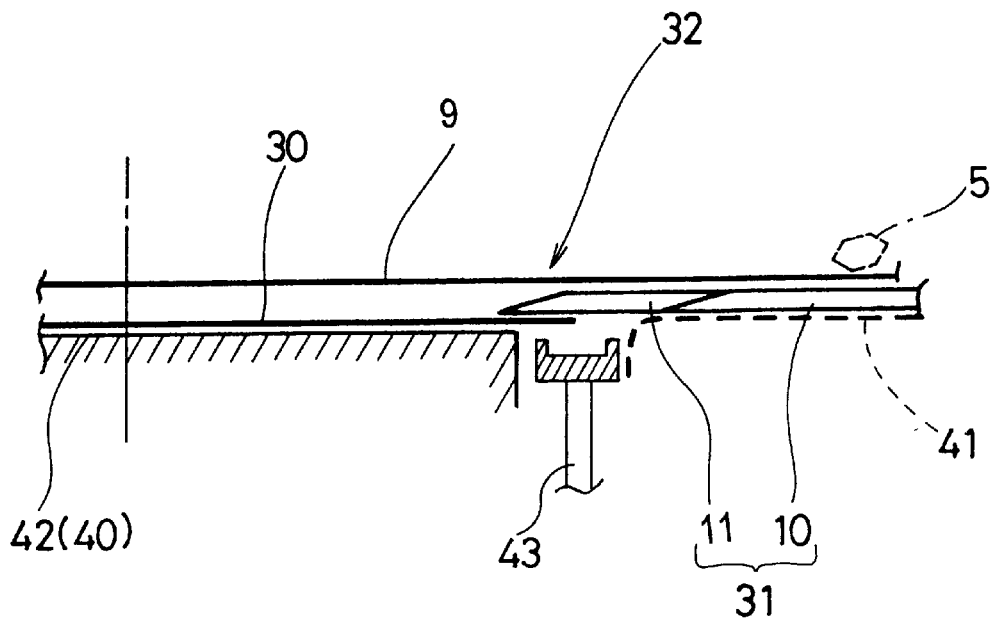
FIG. 11 to FIG. 14 are diagrams for explaining a method of manufacturing a tire having the bead cavity.
Figure 12:
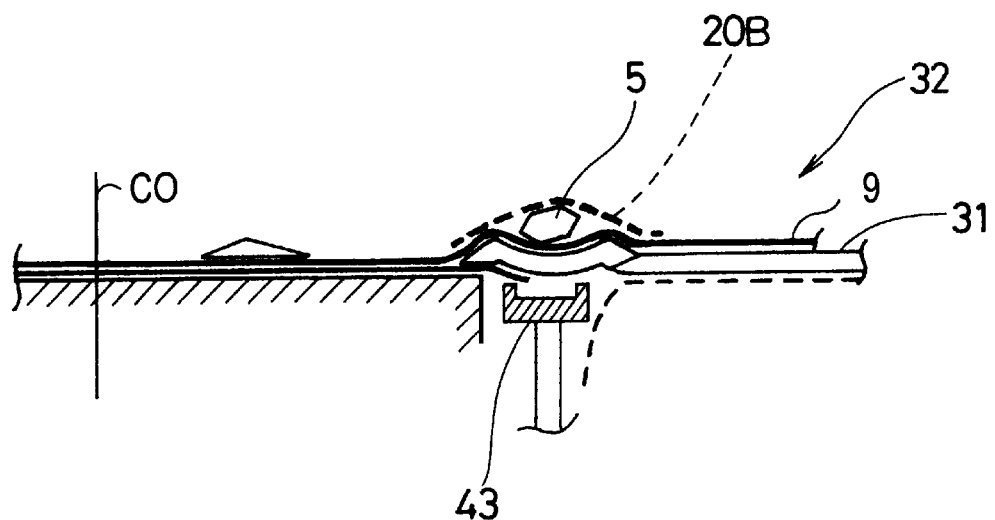

FIG. 9 shows another example of the sealing structure, wherein the sealing layer 20B extends beneath the bead core 5 so as to wrap the bead core therein.

The adhesion of the butyl rubber layer 20B is not so good when compared with the topping rubber. Therefore, to prevent separation, inserting length L5 of the sealing layer 20B between the carcass ply main portion 9A and turnup portion 9B is set to be not more than 5 mm.

Further, the radial height L6 of the upper end of the sealing layer 20B is preferably not more than 3.0 times the flange height H.

Figure 10:
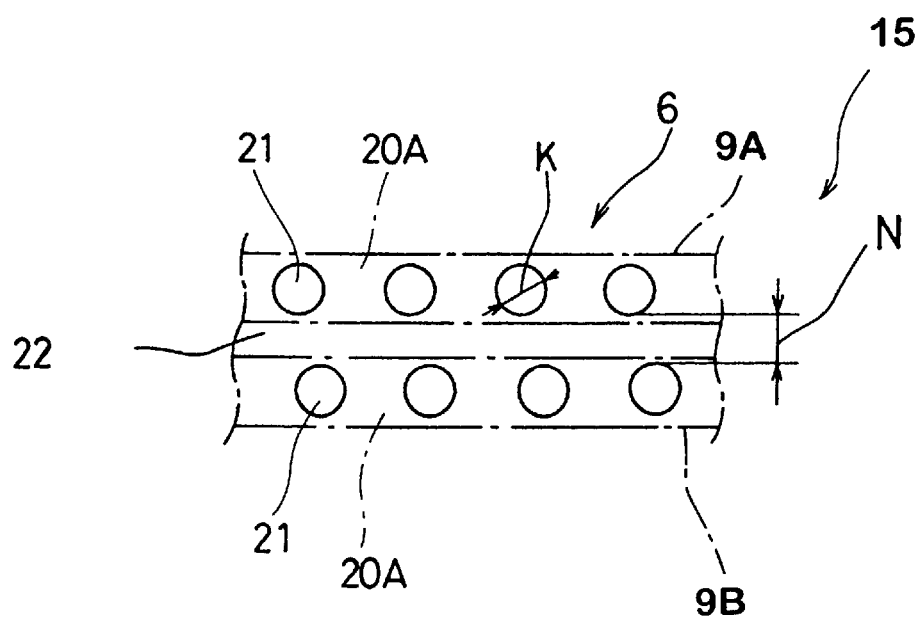
FIG. 10 is a diagram for explaining the carcass cord distance in the adjoining part.

As shown in FIG. 10, in the adjoining part 15, the rubber thickness N between the carcass cords 21 of the main portion 9A and the carcass cords 21 of the turnup portion 9B is set in the range of from 0.15 to 4.5 times, preferably 1.3 to 3.5 times the diameter K of the carcass cords 21. If the thickness N is less than 0.15 times K, it is difficult to mitigate the shearing force, and there is the danger that the carcass cords 21 directly contact with each other, and thus a carcass ply separation is caused. If the thickness N is more than 4.5 times K, the turnup portion 9B is liable to be broken by a compressive stress and the heat generation is liable to increase.

In this example, to provide the thickness N, a cushion rubber layer 22 having substantially same hardness as the topping rubber is disposed between the carcass ply main portion 9A and the turnup portion 9B. However, it is also possible to use the carcass ply topping rubber itself.

The length L2 of the adjoining part 15 is in the range of from 0.5 to 5.0 times preferably 1.0 to 4.0 times the maximum section width BW of the bead core 5. If the length L2 is less than 0.5 times BW, the bead durability decreases. If the length L2 is more than 5.0 times BW, it is difficult to improve the bead durability, and the tire surface is liable to undulate and a carcass ply edge separation is liable to occur because the outer end of the turnup portion 9B reaches to a position where the sidewall rubber is relatively thin.

In this embodiment, the chafer 11 extends radially outwards, while abutting the axially outside of the turnup portion 9B, to a radial height L3, wherein the height L3 is more than the radial height (h) of the cavity. As a result, the bead rigidity is increased, and thereby running performance such as steering stability and the like can be improved.

Comparison test 3

Heavy duty radial tires of size 11R22.5 having the structure shown in FIG. 6 and FIG. 9 were prepared and tested for the bead durability, steering stability and tire weight. The test tires had a carcass composed of a single ply of steel cords (3×0.17+7×0.20) arranged at an angle of 90 degrees with respect to the tire equator at a cord count of 21 (/5 cm) at the tread center, and a belt composed of four plies of steel cords (3×0.20+6×0.35) laid parallel with each other at a cord count of 26 (/5 cm). The cord angles of the four plies were +67/+18/−18/−18 degrees (from inside to outside).

Bead durability test: Using the tire test drum, each test tire was subjected to a 10000-kilometer continuous running test under the following conditions, and the running distance L1 to any visible damage was measured.

Running speed: 20 km/h
Tire load: 9000 kgf
Tire pressure: 1000 kPa
Wheel rim: 8.25×22.5 standard rim In Table 3, the ratio of the distance L1 to 10000 kilometers is indicated by an index based on Reference tire C being 100.

Steering stability test: Running a 10-ton truck provided on all the wheels with test tires on an asphalt road, the test driver evaluated the steering response, rigidity, road grip and the like. The results are indicated by an index based on reference tire C being 100, wherein the larger the index, the better the steering stability.

Tire pressure: 800 kPa
Wheel rim: 8.25×22.5 standard rim

Tire weight: In Table 3, the tire weight is indicated by an index based on Reference tire being 100.

Figure 13:
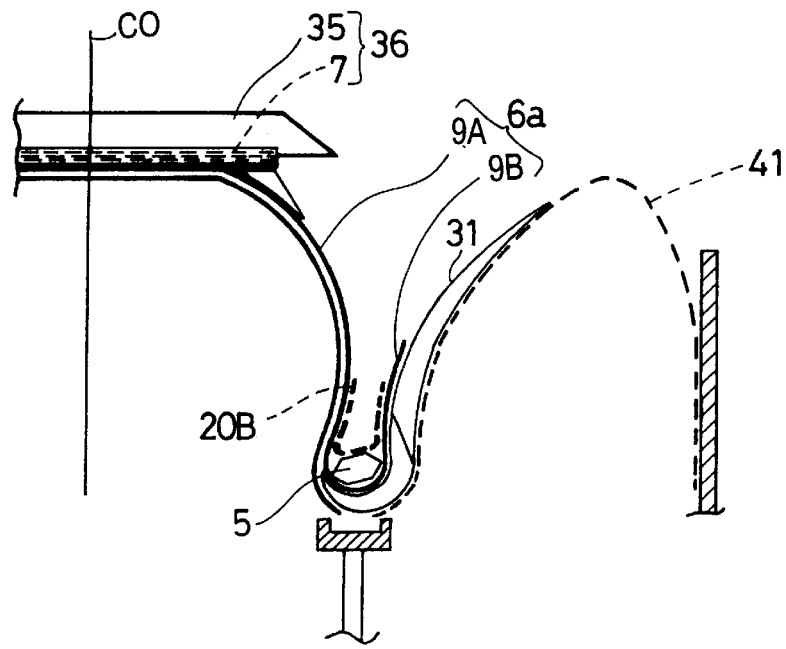
Figure 14:
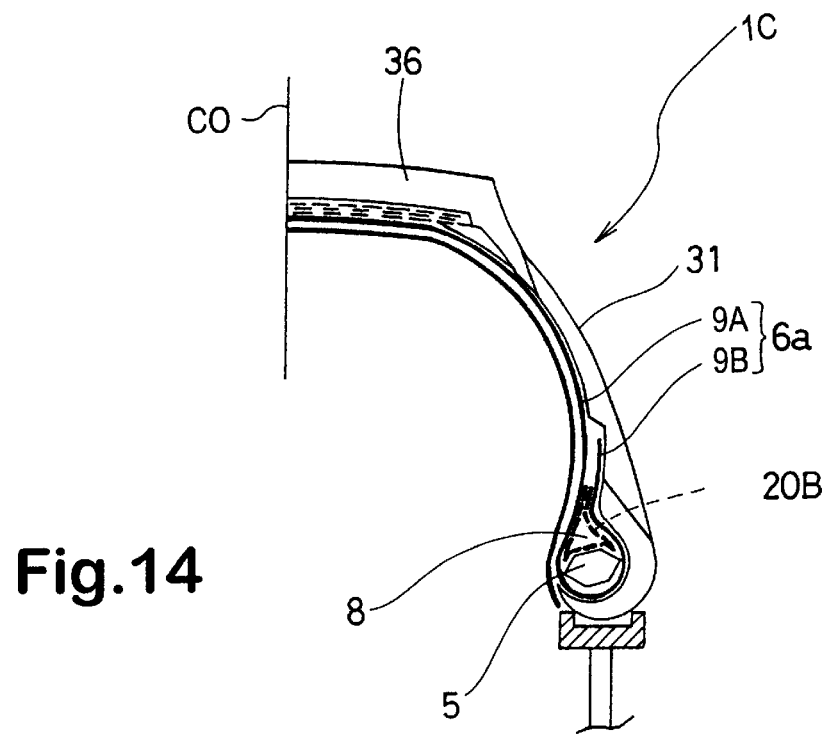

The specifications of the test tires and test results are shown in Table 3.

is expanded to fix the bead core, wherein the bead core is covered with a textile fabric 19 in advance. Further, a butyl rubber seat for the sealing layer 20B is wound over the bead core 5. Here, the tire building drum 40 comprises a central former 42 and a pair of side formers 41. The central former 42 can be expanded, for example, by means of inflation of a bladder, and also, the side former 41 can be expanded by means of inflation of a bladder. Further, a tread ring 36 made up of a tread rubber 35 and a belt 7 which are assembled beforehand is put around the carcass main portion. Next, as shown in FIG. 13, the central former 42 and side formers 41 are expanded in order that the carcass main portion is shaped in a toroidal shape, and the carcass turnup portions 9B and the rubber strip 31 is folded around the bead core 5 onto the carcass main portion 9A. By the expansion of the carcass main portion 9A, the carcass main portion 9A is pressed against the tread ring 36. The raw tire 1C built up as above is put in a mold and vulcanized by applying heat and pressure. During the vulcanizing process, the cavity 8 is provided with an internal pressure of over an atmospheric pressure.

As explained above, the present invention can be suitably applied to heavy duty tires and light truck tires. However, it is also possible to apply the invention to passenger car tires and the like.

TABLE 3

| Tire | Ex. C1 | Ex. C2 | Ex. C3 | Ex. C4 | Ex. C5 | Ex. C6 | Ex. C7 | Ex. C8 | Ex. C9 | Ex. C10 | Ref. C |
|---|---|---|---|---|---|---|---|---|---|---|---|
| Cavity height h (mm) | 28 | 40 | 28 | 28 | 28 | 28 | 28 | 28 | 28 | 28 | — |
| Ratio h/H | 2.2 | 3.1 | 2.2 | 2.2 | 2.2 | 2.2 | 2.2 | 2.2 | 2.2 | 2.2 | — |
| Sealing rubber layer | | | | | | | | | | | |
| Thickness Ta (mm) | 0.8 | 0.8 | 0.8 | 0.8 | 0.8 | 0.8 | 0.8 | 0.8 | 0.8 | 0.8 | — |
| Thickness T (mm) | 1.0 | 1.0 | 1.0 | 1.0 | 1.0 | 1.0 | 1.0 | 1.0 | 1.0 | 1.0 | — |
| Inserting Length L5 (mm) | 3.0 | 3.0 | 6.0 | 3.0 | 3.0 | 3.0 | 3.0 | 3.0 | 3.0 | 3.0 | — |
| Carcass | | | | | | | | | | | |
| Adjoining part Length L2 (mm) | 55 | 55 | 55 | 7 | 55 | 55 | 55 | 55 | 55 | 55 | 55 |
| Ratio L2/BW | 3.7 | 3.7 | 3.7 | 0.4 | 5.2 | 3.7 | 3.7 | 3.7 | 3.7 | 3.7 | 3.7 |
| Rubber thickness N (mm) | 1.3 | 1.3 | 1.3 | 1.3 | 1.3 | 0.1 | 3.6 | 1.3 | 1.3 | 1.3 | 1.3 |
| Ratio N/K | 1.7 | 1.7 | 1.7 | 1.7 | 1.7 | 0.13 | 4.7 | 1.7 | 1.7 | 1.7 | 1.7 |
| Chafer | | | | | | | | | | | |
| Height L3 (mm) | 65 | 65 | 65 | 65 | 65 | 65 | 65 | 25 | 25 | 25 | 25 |
| 100% modulus (kgf/sq. cm) | 60 | 60 | 60 | 60 | 60 | 60 | 60 | 60 | 54 | 76 | 60 |
| Test Results | | | | | | | | | | | |
| Bead durability | 150 | 105 | 130 | 102 | 150 | 80 | 101 | 75 | 105 | 110 | 100 |
| Steering stability | 105 | 103 | 105 | 100 | 105 | 103 | 100 | 90 | 95 | 100 | 100 |
| Tire weight | 98 | 97 | 98 | 96 | 103 | 97 | 102 | 98 | 98 | 98 | 100 |

From the test results, it was confirmed that test tires according to the present invention can be improved in the bead durability and weight wile maintaining the steering stability.

Tire Manufacturing Method

FIG. 11 to FIG. 14 show a method of manufacturing the tire 1C having the cavity 8.

First, an inner liner rubber 30 is wound around a tire building drum 40. On each side of the inner liner rubber 30, a strip of rubber 31 made up of a chafer rubber 11 and a sidewall rubber 10 connected with each other, is further wound. Further, a carcass ply 9 is wound thereon to form a cylindrical main body 32. A pair of annular bead cores 5 are put around the cylindrical main body 32, and a bead lock 43

What is claimed is:

1. A pneumatic tire comprising
   a tread portion,
   a pair of sidewall portions,
   a pair of bead portions each with a bead core therein,
   a carcass comprising a carcass ply extending between the bead portions and turned up around the bead core in each bead portion to form two turnup portions and a main portion therebetween,
   each said turnup portion extending radially outwardly and adjoining the main portion from a certain height h above the bead core so as to form an adjoining part
   a bead core cover disposed between the carcass ply and the bead core for preventing cords of the carcass from directly contacting with the bead core, the bead core cover being made of a rubber layer, a space in each bead portion surrounded by the carcass ply main portion, the turnup portion and the bead core filled with a bead apex rubber, the bead apex rubber having a JIS-A hardness of 70 to 100 degrees and tapering radially outwardly from the bead core, the radially outer end of the bead apex disposed at said height h being in a range of from H−15 mm to H+15 mm, wherein H is the height of a flange of a standard wheel rim on which the tire is intended to be mounted, and wherein said bead core cover is a rubber layer having a JIS-A hardness being in the range of from 50 to 80 degrees and being less than that of the bead apex rubber and having a substantially constant thickness of from 1.0 to 3.0 mm, and the bead core cover extends continuously from the axially inside to outside of the bead apex through the underside of the bead core, and said bead core cover extends continuously from both the axially inside and outside of the bead apex to the adjoining part so as to form a rubber layer between the carcass ply turnup portion and the main portion which rubber layer has a substantially constant thickness of from 2.0 to 6.0 mm, a JIS-A hardness of 50 to 80 degrees, and a length along the carcass ply of from 5 to 15 mm.

2. The pneumatic tire according to claim 1, wherein the bead core cover is further made of a textile fabric of organic fiber yarn.

3. The pneumatic tire according to claim 1, wherein said carcass comprises an outer ply and said carcass ply as an inner ply, both of the inner and outer plies made of organic fiber cords, the turnup portions of the inner ply are turned up from the inside to outside of the tire, the outer ply is disposed on the inner ply so as to cover the outside of the main portion and the outside of the turnup portions of the inner ply and terminates axially outside the bead core or beneath the bead core not to form a turned up portion.

4. The pneumatic tire according to claim 1, wherein
said tread portion is provided with a belt comprising two cross plies of cords inclined at 10 to 30 degrees with respect to the tire equator.

* * * * *